United States Patent
Fang et al.

(10) Patent No.: US 10,468,939 B2
(45) Date of Patent: Nov. 5, 2019

(54) COOLANT SLEEVE AND FIXING DEVICE THEREOF AND ELECTRIC MACHINE

(71) Applicant: Schaeffler Technologies AG & Co. KG, Herzogenaurach (DE)

(72) Inventors: Shanguo Fang, Shanghai (CN); Markus Wagenbret, Gruenstadt (DE); Zhenhua Wu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/759,724

(22) PCT Filed: Jul. 20, 2016

(86) PCT No.: PCT/CN2016/090648
§ 371 (c)(1),
(2) Date: Mar. 13, 2018

(87) PCT Pub. No.: WO2017/045478
PCT Pub. Date: Mar. 23, 2017

(65) Prior Publication Data
US 2018/0254684 A1    Sep. 6, 2018

(30) Foreign Application Priority Data

Sep. 14, 2015    (CN) .......................... 2015 1 0583975

(51) Int. Cl.
*H02K 5/20* (2006.01)
*H02K 9/19* (2006.01)

(52) U.S. Cl.
CPC ................. *H02K 5/20* (2013.01); *H02K 9/19* (2013.01)

(58) Field of Classification Search
CPC .................................. H02K 9/19; H02K 5/20
(Continued)

(56) References Cited

U.S. PATENT DOCUMENTS 5,272,710 A * 12/1993 Sumida ................... H01S 3/042
372/34
2011/0200469 A1 * 8/2011 Kawabata .......... F04D 13/0606
417/423.3
(Continued)

FOREIGN PATENT DOCUMENTS

CN    200990534 Y    12/2007
CN    202679157 U    1/2013
(Continued)

OTHER PUBLICATIONS

International Search Report for PCT/CN2016/090648; 2 pgs; dated Sep. 30, 2016 by China Patent Office.

*Primary Examiner* — Alex W Mok
(74) *Attorney, Agent, or Firm* — LeKeisha M. Suggs

(57) ABSTRACT

A liquid coolant sleeve fixing device for fixing the cylindrical liquid coolant sleeve in a radially interior part of a housing is disclosed. The coolant sleeve fixing device includes a bolt for fixing the liquid coolant sleeve and the housing, and an axial installation hole disposed on an axial side of the housing and used for installing the bolt. The fixing device also includes a recess disposed on an axial side of the liquid coolant sleeve, and a press plate of a shape which fits the recess, the quantity of the press plate being the same as the quantity of the recess. A radially inner side part of the press plate presses against the interior of the recess. The press plate is fixed to the housing by means of the bolt and installation hole, thereby fixing the liquid coolant sleeve in the radially interior part of the housing.

8 Claims, 3 Drawing Sheets

(58) Field of Classification Search
 USPC .......................................................... 310/54
 See application file for complete search history.

(56) References Cited

U.S. PATENT DOCUMENTS

| | | | | |
|---|---|---|---|---|
| 2014/0123922 A1* | 5/2014 | Tadokoro | ................ | F01L 1/344 |
| | | | | 123/90.17 |
| 2014/0217841 A1* | 8/2014 | Riegels | .................... | H02K 9/19 |
| | | | | 310/54 |
| 2014/0292117 A1* | 10/2014 | Lee | .......................... | H02K 9/19 |
| | | | | 310/54 |
| 2014/0354089 A1* | 12/2014 | Chamberlin | ............. | H02K 9/19 |
| | | | | 310/54 |
| 2014/0354090 A1* | 12/2014 | Chamberlin | ............. | H02K 9/19 |
| | | | | 310/54 |
| 2015/0188393 A1* | 7/2015 | Ko | .......................... | H02K 5/20 |
| | | | | 310/54 |

FOREIGN PATENT DOCUMENTS

| | | |
|---|---|---|
| CN | 202840789 U | 3/2013 |
| CN | 103248165 A | 8/2013 |
| CN | 105703524 A | 6/2016 |
| JP | 2013215056 A | 10/2013 |
| KR | 20000058594 A | 10/2000 |

\* cited by examiner

COOLANT SLEEVE AND FIXING DEVICE THEREOF AND ELECTRIC MACHINE

CROSS-REFERENCE TO RELATED APPLICATIONS

This application is the United States National Phase of PCT Appln. No. PCT/CN2016/090648 filed Jul. 20, 2016, which claims priority to Chinese Application No. CN201510583975.6 filed Sep. 14, 2015, the entire disclosures of which are incorporated by reference herein.

TECHNICAL FIELD

The present disclosure relates to a liquid coolant sleeve and a fixing device thereof, and an electric machine on which such a liquid coolant sleeve has been installed.

BACKGROUND ART

An electric power drive assembly is one of the core motive power assemblies of an electric vehicle or hybrid vehicle. Since the operating principle of an electric motor is different from that of an internal combustion engine, a high temperature will lead to an electric motor fault and thereby affect normal operation. An electric power drive assembly using an electric motor as a source of motive power is often provided with a cooling system for dissipating heat from the electric motor. This is commonly a liquid cooling system, i.e. a liquid coolant sleeve is provided outside the electric motor to enable liquid coolant to flow through regions from which heat needs to be dissipated, thereby lowering the temperature of the electric power drive assembly, and ensuring that the electric motor is within a reasonable operating temperature range.

The prior art is as shown in FIG. 1b. Due to the demands of installation and positioning, the liquid coolant sleeve outside the electric motor is often provided with multiple lugs for bolt fixing at an axial end thereof. In order to produce lugs at the end of the liquid coolant sleeve, it is necessary to use an annular blank with a larger original wall thickness. The wall thickness thereof must be greater than a radial dimension of the lugs, as shown in FIG. 1a. However, in order to produce lugs at just one end, most of the material of the annular blank will be removed during machining, to attain a liquid coolant sleeve wall thickness which meets requirements, therefore the degree of wastage of starting material is high. Moreover, due to the large area of machining, the process control requirements for machining are also high, and the processing procedure is complex, so processing costs are further increased.

At the same time, as shown in FIG. 2, since the liquid coolant sleeve is fixed to a housing directly using bolts, stress concentration points readily occur on the surfaces of contact of the liquid coolant sleeve and the housing due to insufficient matching, readily causing wear at contact positions and damage to components in the long term.

Hence, there is a need to provide a simpler production method having an improved durability and to produce an electric motor liquid coolant sleeve to solve the abovementioned problem.

BRIEF SUMMARY

The present disclosure provides a liquid coolant sleeve fixing device for fixing the cylindrical liquid coolant sleeve in a radially interior part of a housing. The coolant sleeve fixing device includes a bolt for fixing the liquid coolant sleeve and the housing, and an axial installation hole disposed on an axial side of the housing and used for installing the bolt. The fixing device also includes a recess disposed on an axial side of the liquid coolant sleeve, and a press plate of a shape which fits the recess, the quantity of the press plate being the same as the quantity of the recess. A radially inner side part of the press plate presses against the interior of the recess. The press plate is fixed to the housing by means of the bolt and installation hole, thereby fixing the liquid coolant sleeve in the radially interior part of the housing.

In an example embodiment, a radially outer side of the press plate presses against the housing by means of a post-shaped structure extending in a circumferential direction, with linear contact between the press plate and the post-shaped structure.

In an example embodiment, the post-shaped structure is a cylindrical structure.

In an example embodiment, a groove of a shape matching the post-shaped structure is disposed on the housing, the post-shaped structure being embedded in the groove and having a part which is exposed outside the groove and in linear contact with the press plate.

In an example embodiment, the post-shaped structure is embedded in the groove, forming surface contact with the groove.

In addition, the present disclosure also provides a liquid coolant sleeve fixed to a housing using the liquid coolant sleeve fixing device described above, and an electric machine for an electrically driven vehicle, the electric machine having such a liquid coolant sleeve.

Compared with the prior art, the present disclosure has the following advantages: Due to the split-type fixing device, the structure of the liquid coolant sleeve is simplified, hence the production process and steps are simplified, and materials and costs are reduced accordingly. All the components in the fixing structure are in linear contact or surface contact; the increased contact area avoids situations of stress concentration, so process accuracy requirements are further lowered, at the same time reducing the probability of damage, and extending the service life.

DETAILED DESCRIPTION

Figure 1A:
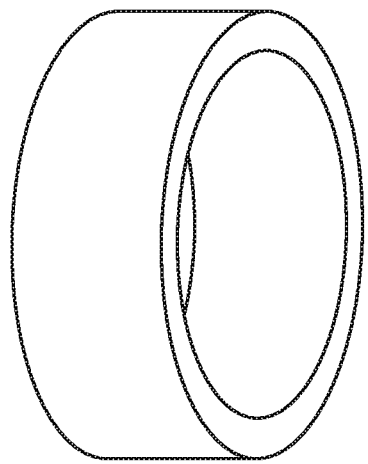
FIG. 1a is an isometric view of a prior art electric motor housing.
Figure 1B:
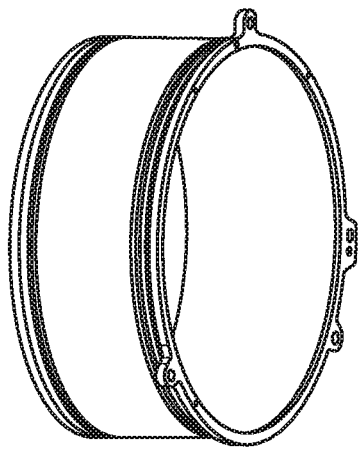
FIG. 1b is an isometric view of a prior art electric motor liquid coolant sleeve.
Figure 2:
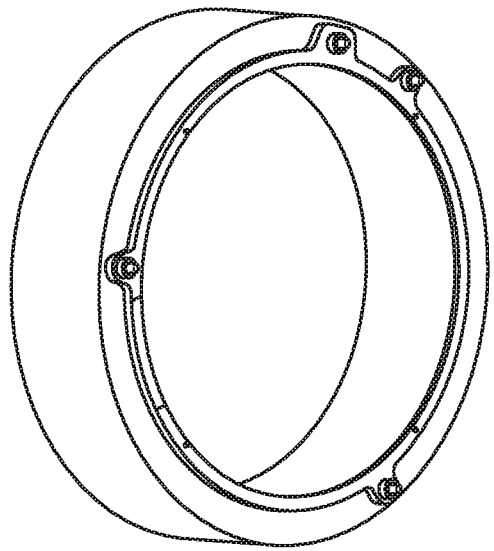
FIG. 2 is an isometric view of a prior art electric motor liquid coolant sleeve installed on a housing.
Figure 3:
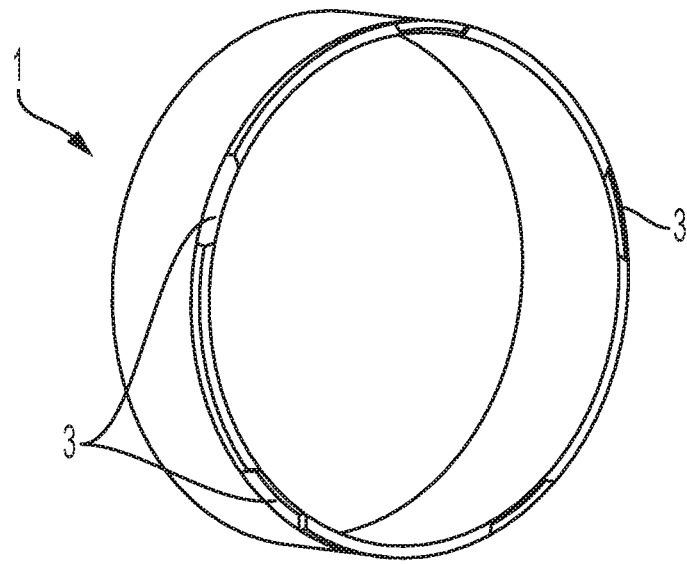
FIG. 3 is an isometric view of an electric motor liquid coolant sleeve according to an example embodiment.
Figure 4:
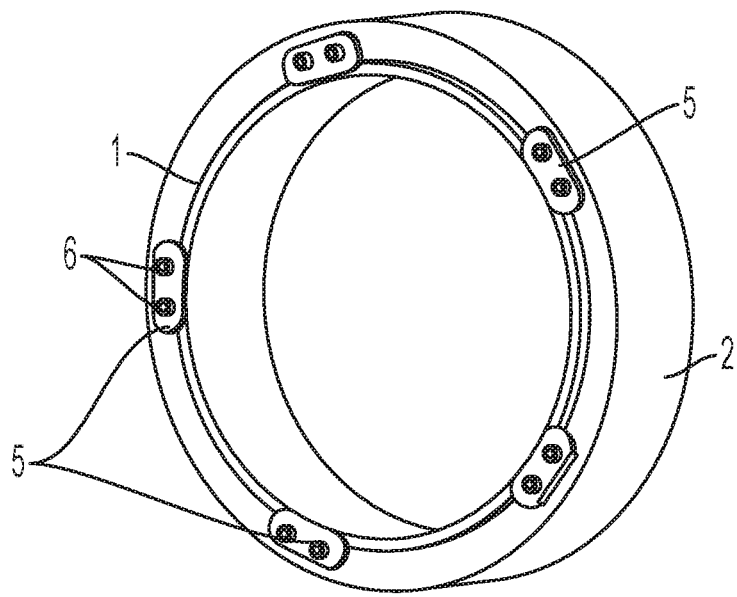
FIG. 4 is an isometric view of the electric motor liquid coolant sleeve of FIG. 3 shown installed on a housing.

As shown in FIG. 3, a fixing device of the electric motor liquid coolant sleeve 1 of the present disclosure includes a number of recesses 3 disposed on an axial end side face, i.e. an installation end face of the liquid coolant sleeve 1. The recesses 3 are used for fixing the liquid coolant sleeve 1 on a radially inner side of the housing 2 in a manner which resists relative rotation. As shown in FIG. 4, the fixing device also includes press plates 5 which fit the recesses 3 on the liquid coolant sleeve, the press plates 5 being fixed to the housing 2 by bolts 6; the quantity of the press plates 5 is the same as the quantity of the recesses 3, and the shape of the press plates matches the shape of the recesses. The press plates 5 fix the liquid coolant sleeve 1 on the radially inner side of the housing in an axial direction, and at the same time, can provide fixing to the liquid coolant sleeve in a circumferential direction due to the fitting of the recesses 3, preventing relative rotation between the liquid coolant sleeve and the housing. The press plates 5 are fixed to the housing 2 by bolts 6.

The fixing device also includes bolts 6 for fixing the press plates 5, and installation holes disposed on the housing 2 and used for installing the bolts 6; two bolts 6 arranged in the circumferential direction are used to fix each press plate 5 to the housing 2.

Figure 5:
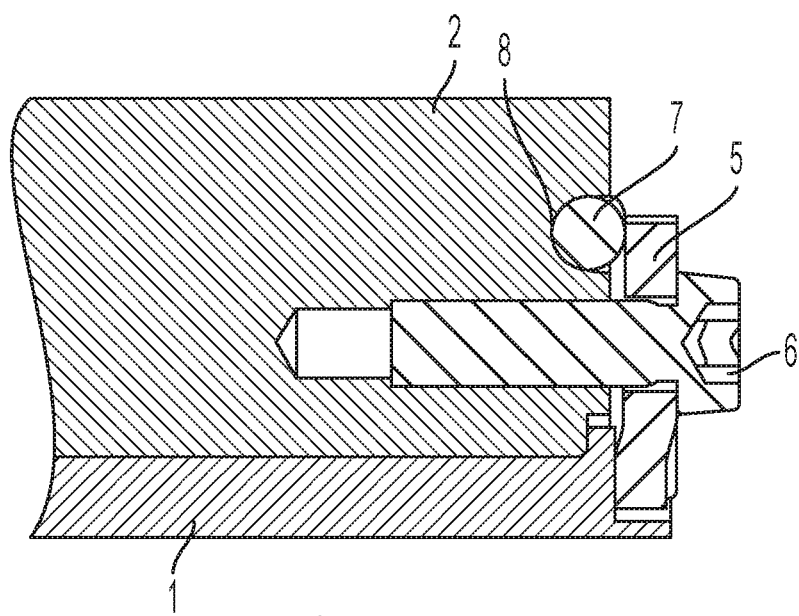
FIG. 5 is a partial cross section view of a fixing device of the electric motor liquid coolant sleeve installed on the housing in FIG. 4.

In addition, as shown in FIG. 5, the fixing device also includes a cylindrical structure 7 disposed on a radially outer side of the press plate 5, between the press plate 5 and the housing 2; the cylindrical structure 7 is also disposed in the circumferential direction. A part of the press plate 5 on a radially inner side fits the recess 3 of the liquid coolant sleeve 1; a part on the radially outer side presses against the cylindrical structure 7. A circumferential groove 8 matching the cylindrical structure 7 is also disposed on the housing 2. An axial depth of the circumferential groove is approximately half the diameter of a cross section of the cylindrical structure; a part of the cylindrical structure 7 is embedded in the groove 8, while another part protrudes outward.

Radially inner and outer edges of the press plate 5 press against the interior of the recess 3 in the liquid coolant sleeve and against the cylindrical structure 7 respectively. As the bolts 6 are gradually tightened, axial pressure is gradually generated at the radially inner edge of the press plate 5, fixing the liquid coolant sleeve in place. Since the press plate 5 does not come into contact with the liquid coolant sleeve 1 and the housing 2, but comes into linear contact with the two at the radially inner and outer edges respectively, the process requirements regarding the geometric shape thereof are vastly lowered, and loosening due to problems mating with a contact surface of the housing 2, which would affect a fixing result, will not occur. Moreover, the pressure applied to the housing 2 by the press plate 5 is progressively dispersed onto the housing 2 through linear contact with the cylindrical structure 7 and surface contact between the cylindrical structure 7 and the housing 2, and will not give rise to local stress concentration on the housing 2, so the possibility of damage to the housing 2 due to stress is further reduced.

Although the present disclosure has been described with respect to only certain demonstrative embodiments, these descriptions should only serve as examples, without constituting any limitation. Various changes, which do not depart from the spirit and scope of the present disclosure, are possible within the scope recorded in the attached claims.

The invention claimed is:

1. An electric motor housing assembly comprising:
   a housing comprising a radially interior part, a first axial side, and a first installation hole disposed on the first axial side;
   a liquid coolant sleeve comprising a second axial side and a recess with a first shape and an interior, the recess being disposed on the second axial side;
   a press plate having a second shape and a radially inner side, the second shape being such that the press plate fits the recess; and,
   a first bolt, wherein:
      the first bolt is installed into the first installation hole to fix the press plate to the housing;
      the radially inner side presses against the interior; and,
      fixing the press plate to the housing fixes the liquid coolant sleeve in the radially interior part.

2. The electric motor housing assembly as claimed in claim 1, further comprising a post-shaped structure extending in a circumferential direction, wherein:
   the press plate comprises a radially outer side;
   the post-shaped structure is installed between the housing and the radially outer side; and,
   the press plate presses against the housing through linear contact between the press plate and the post-shaped structure.

3. The electric motor housing assembly as claimed in claim 2, wherein the post-shaped structure is a cylindrical structure.

4. The electric motor housing assembly as claimed in claim 2, wherein:
   the housing comprises a groove;
   a post-shaped structure is embedded in the groove; and,
   a part of the post-shaped structure is exposed outside the groove and is in a linear contact with the press plate.

5. The electric motor housing assembly as claimed in claim 4, wherein the post-shaped structure has a surface contact with the groove.

6. The electric motor housing assembly as claimed in claim 1 wherein the press plate comprises a hole for receiving the first bolt.

7. The electric motor housing assembly as claimed in claim 1 further comprising a plurality of recesses and a plurality of press plates, wherein a quantity of the plurality of recesses is equal to a quantity of the plurality of press plates.

8. The electric motor housing assembly as claimed in claim 1 further comprising a second bolt and a second installation hole, wherein the press plate comprises first and second holes for receiving the first and second bolts, respectively, and the press plate is fixed to the housing by the first and second bolts installed in the first and second installation holes, respectively.

* * * * *